April 2, 1946.    T. V. BUCKWALTER    2,397,647
ROLLER BEARING AXLE
Filed Nov. 15, 1943    2 Sheets-Sheet 1
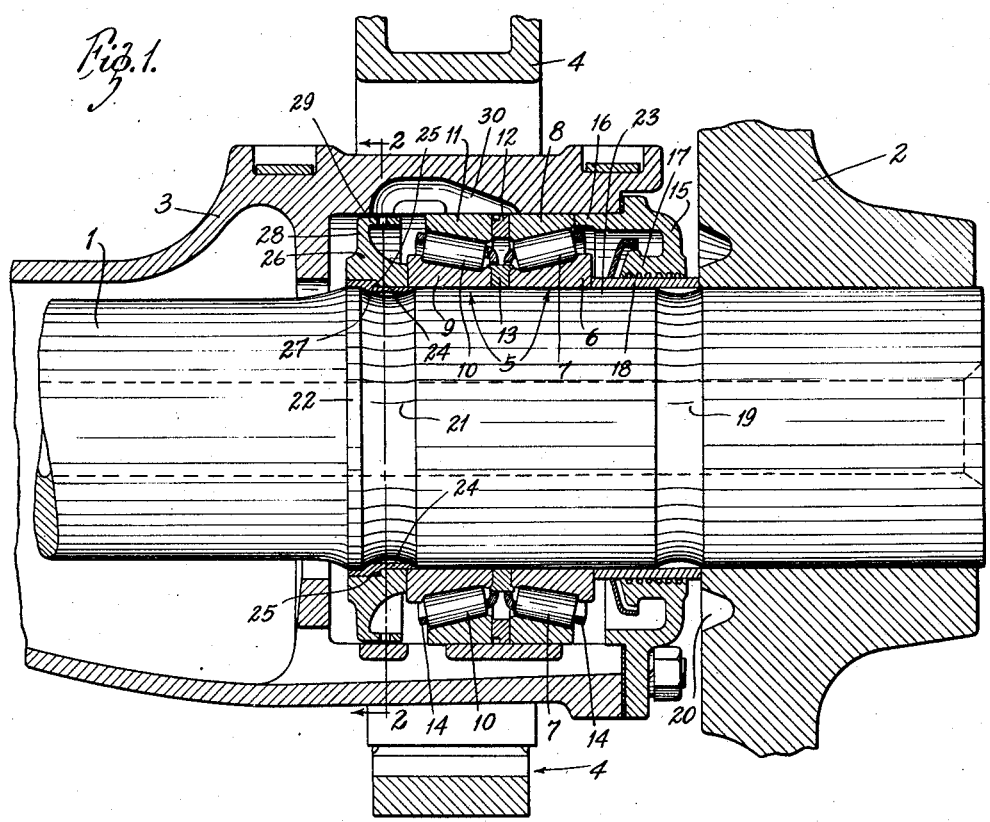
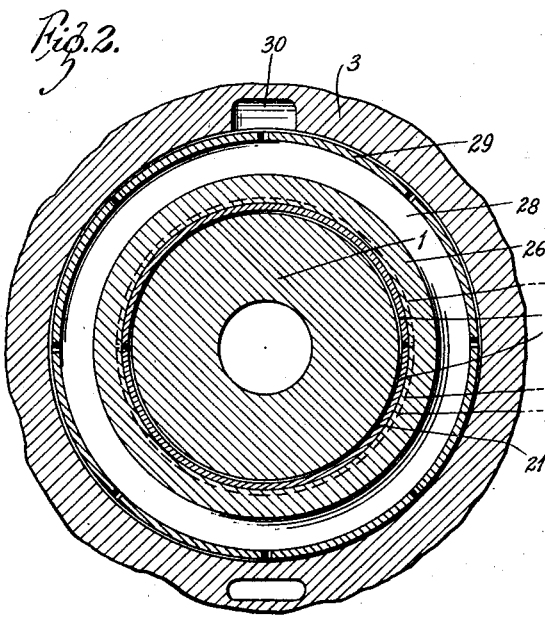
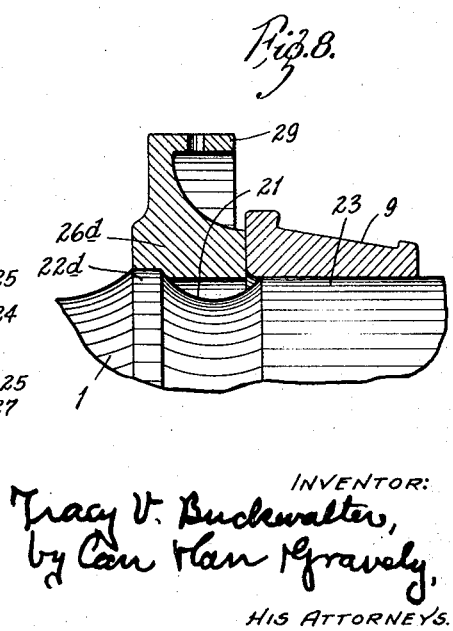

April 2, 1946. T. V. BUCKWALTER 2,397,647
ROLLER BEARING AXLE
Filed Nov. 15, 1943 2 Sheets-Sheet 2
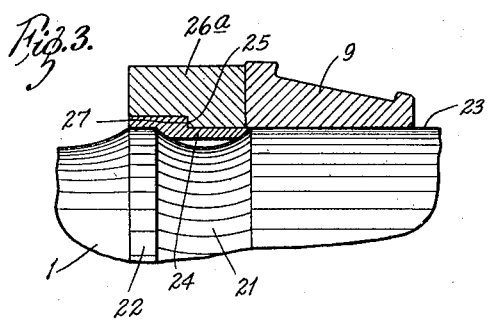
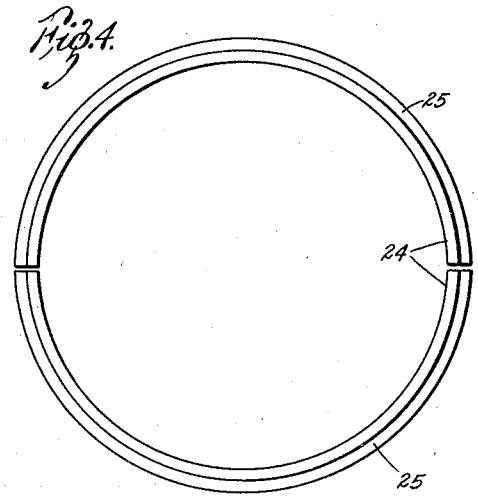
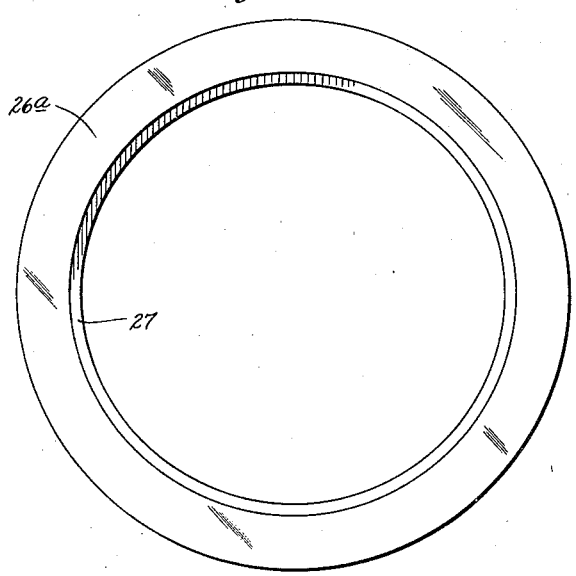
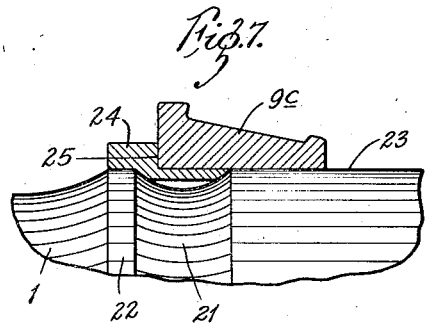
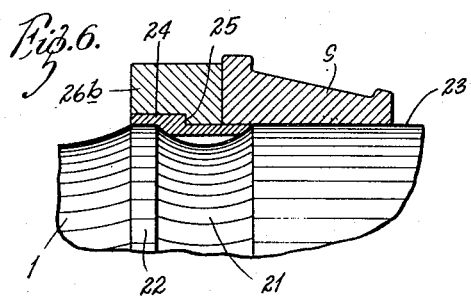
INVENTOR:
Tracy V. Buckwalter,
by Cau Han Gravely
HIS ATTORNEYS.

Patented Apr. 2, 1946

2,397,647

UNITED STATES PATENT OFFICE 2,397,647

ROLLER-BEARING AXLE

Tracy V. Buckwalter, Massillon, Ohio, assignor to The Timken Roller Bearing Company, Canton, Ohio, a corporation of Ohio Application November 15, 1943, Serial No. 510,274

4 Claims. (Cl. 308—180)

My invention relates to roller bearing axle constructions for railway engine trucks and the like, wherein the axle has a stress deconcentration groove adjacent to or partially underlying the end thrust transmitting end of the inner bearing member of a roller bearing, thus preventing the taking of such end thrust in the usual manner, namely, abutting the end of said inner bearing member against a thrust shoulder on the axle. The invention has for its principal object to provide means for taking the end thrust in roller bearing axle constructions of said type having a stress deconcentration groove in the axle adjacent to an inner bearing member. Other objects and advantages of the invention will appear hereinafter.

The invention consists principally in providing the axle with a thrust shoulder at the margin of said stress deconcentration groove remote from the end of the inner bearing member, such shoulder having the same outside diameter as the bearing seat of the axle, in mounting on said shoulder a two piece ring having a sleeve portion extending across said groove, but clear of the bottom wall thereof and having an external shoulder and in mounting on said two-piece ring an internally shouldered abutment ring for transmitting end thrust from the bearing member to the two-piece ring and thence to said trust shoulder. The invention further consists in the roller bearing axle construction and in the parts and combinations and arrangement of parts hereinafter described and claimed.

In the accompanying drawings, wherein like reference characters refer to like parts wherever they occur:

Fig. 1 is a longitudinal sectional view of a roller bearing axle construction embodying my invention, Fig. 2 is a cross-sectional view on the line 2—2 in Fig. 1, Fig. 3 is a fragmentary longitudinal sectional view showing a modification, Fig. 4 is an elevation of the two-piece thrust transmitting ring of Fig. 3, Fig. 5 is an elevation of the solid abutment ring of Fig. 3, Fig. 6 is a fragmentary sectional view showing another modification, Fig. 7 is a fragmentary sectional view showing another modification; and Fig. 8 is a fragmentary sectional view showing a modification dispensing with the two-piece ring that is used in each of the other modifications.

Fig. 1 illustrates one end of a railway engine axle bearing construction, including a tubular inner axle 1 on whose end an engine wheel 2 is pressed, an axle housing 3 surrounding said axle and cooperating with members 4 of the truck frame and tapered roller bearings 5 interposed between the axle and the axle housing, said bearings including an outermost inner bearing member or cone 6 adjacent to the wheel with its cooperating rollers 7 and outer bearing member or cup 8, an innermost inner bearing member or cone 9 with its cooperating rollers 10 and outer bearing member or cup 11, a spacer ring 12 between the cups 8 and 11, a spacer ring 13 between the cones 6 and 9 and cages 14 for the respective series of rollers 7 and 10. A closure member 15 is mounted in the outermost end of the bearing housing 3, said closure member having a sleeve portion 16 abutting against the outermost cup 8 and an internally grooved sleeve portion 17 cooperating with a sleeve 18 etxending from the outermost bearing cone 6 to the face of the wheel hub 2. The axle is provided with a stress deconcentration groove 19 adjacent to the inner face of the wheel hub and said wheel hub face may also be provided with a stress deconcentration groove 20.

The innermost bearing cone 9 slightly overhangs one edge of a stress deconcentration groove 21 in the axle that is quite shallow and is relatively wide, in comparison with its depth, said groove being curved on a large radius so as to avoid sharp edges. Alongside of the edge of said stress groove remote from the bearing cone 9 is a thrust shoulder 22 whose outside diameter is the same as that of the bearing seat 23 of the axle. Mounted on said thrust shoulder 22 are two half-rings 24 whose adjacent edges are slightly separated, the two rings together constitute a thrust transmitting sleeve.

Each half ring member 24 os said sleeve extends across said stress deconcentration groove 21, the inner periphery of said half ring members being clear of the bottom wall of said groove and contacting only with the marginal portions of said groove. The half ring members are of reduced diameter over a considerable extent of the portions that overlie said groove, thus forming an external shoulder 25 facing said cone 6.

Mounted on said half ring members 24 is a solid ring 26 whose inside diameter is such that it must be forced over the two half rings and that has an internal shoulder 27 cooperating with the combined shoulders 25 of said half rings. The innermost bearing cone 9 abuts against the end of said solid ring 26. Obviously, end thrust is transmitted from the solid ring 26 to the half rings 24 and thence through the thrust shoulder 22 to the axle 1.

Said ring 26 has a disk portion 28 and a peripheral sleeve portion 29 constituting an oil impeller feeding oil to a passageway 30 in the housing 3.

The solid ring 26a shown in Figs. 3 and 5 is similar to that shown in Fig. 1 but does not have the oil impeller.

The modification shown in Figs. 6 and 7 show how the invention may be embodied in existing constructions equipped with plain bearings. If roller bearings be substituted for the plain bearings of such construction, the innermost bearing cone 9 instead of slightly overlapping the stress groove 21 in a construction designed for roller bearings (Fig. 1) will overhang the groove to a considerable extent. In Fig. 6 this overhang is such that there is still a space between the end of the bearing cone and the external shoulders 25 on the half rings 24; so that this construction differs from that in Fig. 3 only in the axial length of the solid ring 26b.

If the bearing overhangs substantially all of the groove, as in Fig. 7, the end of the bearing cone 9c may abut directly against the shoulder 25 on said half rings 24.

In the modification shown in Fig. 8 the half rings 24 are dispensed with and the solid thrust transmitting ring 26d is mounted directly on the thrust shoulder 22d. In this arrangement, the outside diameter of said thrust shoulder 22d is greater than that of the bearing seat 23 on the axle, so that said thrust transmitting ring 26d may be slipped over said bearing seat and forced onto said shoulder.

As is disclosed in my Patent No. 1,995,837 the provision of a groove in an axle adjacent to a wheel, bearing cone or the like pressed onto said axle is a very advantageous means of relieving the hoop stresses created by such pressfit. Unfortunately, however, the presence of such a groove prevents the use of the usual abutment shoulder for receiving end thrust from a bearing member, so that the advantage of hoop stress relief is largely or entirely offset by the inadequate transmission of end thrust to the axle, such transmission being confined to pressfit between the axle and the bearing cone. The present invention provides for the taking of end thrust from the bearing cone by the preferred arrangement of an abutment member, instead of taking up such end thrust only in the pressfit of the axle and bearing cone. Obviously, the accommodation of both hoop stress and end thrust is of great importance in producing a safe and long lived axle bearing construction.

Obviously numerous changes may be made without departing from the invention and I do not wish to be limited to the precise construction shown.

What I claim is:

1. In an axle bearing construction, an axle having a bearing seat and a shoulder of the same outside diameter separated by a wide, shallow groove having a large radius of curvature, an inner bearing member pressed on said bearing seat with an end portion overhanging said groove, a split ring mounted on said shoulder with its inner periphery clear of the bottom of said groove and means pressed on said split ring to hold it in position and to transmit thrust from said inner bearing member to said shoulder.

2. In an axle bearing construction, an axle having a bearing seat and a shoulder of the same outside diameter separated by a wide, shallow groove having a large radius of curvature, an inner bearing member pressed on said bearing seat with an end portion overhanging said groove, a split ring mounted on said shoulder with its inner periphery clear of the bottom of said groove and a solid ring on said split ring engaging the end of said inner bearing member.

3. In an axle bearing construction, an axle having a bearing seat and a shoulder of the same outside diameter separated by a wide, shallow groove having a large radius of curvature, an inner bearing member pressed on said bearing seat with an end portion overhanging said groove, a split ring mounted on said shoulder with its inner periphery clear of the bottom of said groove and a solid ring on said split ring engaging the end of said inner bearing member, said split ring having an external shoulder facing said inner bearing member and said solid ring engaging the end of said inner bearing member and having an internal shoulder engaging said shoulder of said split ring.

4. An axle bearing construction comprising an axle having a bearing seat and a shoulder of the same outside diameter separated by a wide shallow groove having a large radius of curvature, an inner bearing member pressed on said bearing seat with an end overhanging said groove, a split ring mounted on said shoulder and extending across said groove with its inner periphery clear of the bottom thereof, said split ring having a portion of reduced external diameter forming a shoulder facing said inner bearing member, a solid ring pressed on said split ring, said solid ring engaging the end of said inner bearing member and having an internal shoulder engaging said external shoulder on said split ring, a second inner bearing member on said bearing seat, a spacer ring between the inner bearing members, a wheel pressed on the outer end of said axle, said axle having a wide shallow groove having a large radius of curvature adjacent to the inner face of said wheel, a sleeve on said axle extending from said second inner bearing member to said wheel clear of said groove, an axle housing surrounding said axle, outer bearing members in said housing and bearing rollers cooperating with the respective inner and outer bearing members.

TRACY V. BUCKWALTER.